2,870,198

PRODUCTION OF CHOLINE SALTS

Howard C. Klein, Brooklyn, N. Y., and Walter Anthony Di Salvo, North Arlington, and Roland Kapp, Newark, N. J., assignors to Nopco Chemical Company, Harrison, N. J., a corporation of New Jersey No Drawing. Application March 22, 1954
Serial No. 417,972

9 Claims. (Cl. 260—501)

This invention relates to choline and more particularly to the production of choline salts.

Choline is a member of the vitamin B group and is generally considered to be necessary for normal nutrition. When used as a supplement in animal and poultry feeds, choline is usually employed in the form of its chloride salt. Choline chloride is not as satisfactory as desired for use, however, in pharmaceutical preparations because of its rather bitter taste and its strong tendency to absorb moisture. In fact, a number of choline salts are rather hygroscopic and because of this production of such salts in an anhydrous condition is made more difficult.

It is the object of this invention to provide improved means for the production of anhydrous salts of choline.

A further object of the invention is to provide improved means for producing salts of choline which are highly suitable for pharmaceutical use.

Other objects of the invention will in part be obvious and will in part appear hereinafter.

The above and other objects of the invention are accomplished by first reacting trimethylamine with ethylene oxide and water in an aqueous alcohol solution containing one mole of water for each mole of trimethylamine, treating the resulting reaction mixture with whatever acid is to be used for producing the choline salt, preferably using an alcoholic solution of the acid, cooling the reaction mixture to a relatively low temperature, and then separating from the cooled reaction mixture the choline salt which crystallizes therefrom at the low temperature. Choline salts produced in this manner are anhydrous and have a purity of 99% or better. In addition, the yields of choline salts which are obtained in this manner are as high and in most cases higher than the yields of choline or choline salts obtained by prior art processes.

The novel process of the invention can be used to produce any desired salt of choline, but it is particularly useful for the production of choline salts which are to be used for pharmaceutical purposes since the salts obtained are of very high purity and are anhydrous. Thus the process of the invention is highly useful for the production of choline dihydrogen citrate and choline tartrate both of which are very useful for incorporating choline into pharmaceutical preparations. The process of the invention will therefore be described primarily with respect to the production of choline dihydrogen citrate and choline tartrate although it will be understood that the process is also highly suitable for producing other salts of choline, e. g. choline chloride, whenever it is desired to produce those salts in a high state of purity and in anhydrous condition.

The alcohols which are suitable for use in the process of the invention are aliphatic alcohols which are water-miscible and which contain from one to four carbon atoms. Thus methyl alcohol, ethyl alcohol, propyl alcohol, isopropyl alcohol, and tertiary butyl alcohol are all highly suitable for use in the process of the invention both in carrying out the reaction of the ethylene oxide with the trimethyl amine and the water and in reacting the desired acid with the choline to produce the desired choline salt.

The ethylene oxide and the trimethylamine can be introduced into the reaction mixture in any desired manner. Thus gaseous trimethylamine can be introduced into an aqueous alcohol solution of ethylene oxide or, conversely, gaseous ethylene oxide can be introduced into an aqueous alcohol solution of trimethylamine. Also, if desired, gaseous trimethylamine and gaseous ethylene oxide can be introduced simultaneously into the aqueous alcohol. In addition, separate alcoholic solutions of ethylene oxide and trimethylamine may be admixed with each other with one or both of the solutions containing water, the total amount of water in the reaction mixture being one mole for each mole of trimethylamine which is present. Any other desired method of mixing the reactants may be employed.

Preferably at least one mole of ethylene oxide is present for each mole of trimethylamine and, if desired, a stoichiometric excess of the ethylene oxide may be present. At least two parts by weight of the alcohol for each part by weight of the trimethylamine are preferably present in the reaction mixture, with from two to three parts by weight of alcohol for each part by weight of trimethylamine being the preferred range. If desired, more than three parts by weight of alcohol for each part by weight of trimethylamine may be employed although there is ordinarily no particular advantage in doing so.

Since both trimethylamine and ethylene oxide are normally gaseous, it is preferable to carry out the reaction of the trimethylamine with the ethylene oxide and the water in a closed vessel although, if desired, the reaction can be carried out in an open vessel at atmospheric pressure. In a closed vessel the course of the reaction can more readily be followed since by carrying out the reaction at a suitable temperature there will normally be a slight pressure built up in the reaction vessel at the beginning of the reaction and as the reaction proceeds to completion the pressure within the vessel drops to atmospheric pressure provided stoichiometric equivalent amounts of trimethylamine and ethylene oxide are employed. Thus, for example, if the reaction is carried out at a temperature of from about 10° to 20° C. using the ratios of reactants and of alcohol specified above, a pressure of from about ten to fifteen pounds per square inch above atmospheric pressure will normally be present in the reaction vessel at the start of the reaction. Then as the reaction proceeds to completion, the pressure drops to or near atmospheric pressure. If desired, the reaction can be carried out at pressures higher or lower than those referred to above. Likewise the temperatures employed can be higher or lower than those referred to above. Thus temperatures of from 0° to 100° C. can suitably be employed along with whatever pressure is developed in the reaction vessel by the reactants at the temperature employed. However, it is preferred that temperatures not higher than about 40° C. be used since temperatures above about 40° C. may give rise to discoloration of the choline solution with attendant decomposition.

When the reaction is carried out at relatively low temperatures, e. g. 10–20° C., the reaction of the ethylene oxide with the trimethylamine and the water will be complete in about five or six hours. At higher temperatures the reaction will proceed more rapidly and higher temperatures may be employed if it is desired to speed up the reaction.

On completion of the reaction of the ethylene oxide with the trimethylamine and the water, the alcoholic solution of choline which is obtained is then admixed with the acid which is to be used in forming the desired salt of choline, preferably using an alcoholic solution of the acid.

This reaction mixture is cooled to about 5° C. or below and held at that temperature for a short time, e. g. about two to three hours is sufficient although to insure recovery of all the desired salt it is preferred to maintain the low temperature for at least about six hours. The desired choline salt is then recovered in crystalline form from the cooled mixture by any desired means, e. g. filtration or centrifugation. The desired choline salt will be anhydrous, have a purity of 99% or better and the yields will normally run about as high or higher than any other method for preparing choline or its salts.

In order to aid the crystallization of the choline salt, it is preferred that a relatively concentrated alcoholic solution of the desired acid be employed in admixing the acid with the alcoholic solution of choline. Thus a saturated alcoholic solution of the desired acid can be employed and, if desired, that solution may be prepared using an alcohol which has been heated to or near its reflux temperature in order to give a higher concentration of the acid in the solvent. By using such a heated, saturated solution of the acid, the total amount of solvent present when the choline salt is being crystallized will be less than if a more dilute solution of the acid is employed. A reduction in the amount of solvent will, of course, aid the crystallization of the choline salt. Any desired concentration of the alcoholic solution of the acid can be employed, however, since the concentration of the alcoholic solution of the choline salt can be adjusted to any desired concentration before carrying out the crystallization of the salt merely by evaporating any desired amount of solvent from the solution prior to carrying out the crystallization. The more dilute the solution of the choline salt is, the greater will be the time required for crystallization of the salt at any particular temperature. Another advantage of using a hot alcoholic solution of the acid in admixing the acid with the choline is the fact that the purity of the recovered choline salt appears to be greatest in most cases when the acid is admixed with the choline in that manner.

For a fuller understanding of the nature and objects of the invention reference may be had to the following examples which are given merely as further illustrations of the invention and are not to be construed in a limiting sense.

*Example I*

153 gm. of trimethylamine were dissolved in 387 gm. of methyl alcohol to which 46 gm. of water had previously been added. The solution was cooled to about 0° C. and then 114 gm. of ethylene oxide gas were introduced into the solution. The reaction mixture was maintained at atmospheric pressure and a temperature of about 0° to 10° C. overnight. A 64 gm. portion of this reaction mixture containing free choline was added to a refluxing solution of 31.5 gm. of anhydrous tartaric acid in 100 ml. of methyl alcohol. This mixture was then cooled with agitation to 5° C. Crystallization of the choline tartrate took place quite rapidly at the low temperature. The crystalline choline tartrate was filtered from the cooled solution. The crystals were white in color, anhydrous and had a purity of 99%. The yield was 45.7 gm. which was a yield of 76.3% based upon the amount of trimethylamine employed. Another 64 gm. portion of the reaction mixture containing free choline was added to a refluxing solution of 44.4 gm. of anhydrous citric acid in 275 ml. of isopropanol. This mixture was then cooled with agitation to 5° C. On cooling, an oil separated which crystallized into white crystals after agitating the cooled mixture for about an hour. The mixture was held overnight at about 5° C. On filtering the cooled mixture, 59 gm. of white crystalline choline dihydrogen citrate having a purity of 99% were obtained. Based upon the amount of trimethylamine employed, the yield was 82.8%.

*Example II*

30 lbs. of trimethylamine were added to 70.4 lbs. of methyl alcohol to which 9.2 lbs. of water had previously been added. To the resulting solution in a closed vessel 23 lbs. of ethylene oxide gas were introduced and the resulting mixture then maintained at a temperature of 15°–20° C. and agitated for six hours. During the reaction the pressure in the reaction vessel varied from about 12 lbs./sq. in. at the start of the reaction to zero lbs./sq. in. at the end of the reaction. The resulting solution was then added with agitation to a refluxing solution of methanol containing 75 lbs. of tartaric acid dissolved therein. The mixture thus obtained was then cooled to 0° C. and held at that temperature overnight. The white crystalline choline tartrate which formed was separated from the solvent by filtration and air dried. 101 lbs. of anhydrous, crystalline choline tartrate having purity of 99.8% were obtained. This was a yield of 79% based on the amount of trimethylamine employed.

*Example III*

30 lbs. of trimethylamine were added to 70.4 lbs. of methyl alcohol to which 9.2 lbs. of water had previously been added. To the resulting solution in a closed vessel 23 lbs. of ethylene oxide gas were introduced and the resulting mixture then maintained at a temperature of 16°–30° C. and agitated for six hours. During the reaction the pressure in the reaction vessel varied from about 17.5 lbs./sq. in. at the start of the reaction to zero lbs./sq. in. at the end of the reaction. The resulting solution was then added with agitation to a refluxing solution of 40 liters of isopropyl alcohol containing 95 lbs. of citric acid dissolved therein. This mixture was then cooled to 0° C. and held at that temperature overnight. The white crystalline choline dihydrogen citrate which formed was separated from the solvent mixture by filtration and dried in vacuo. 117 lbs. of anhydrous, crystalline choline dihydrogen citrate having a purity of 99.6% were obtained. This was a yield of 78% based on the amount of trimethylamine employed.

Having described our invention, what we claim as new and desire to secure by Letters Patent is:

1. A process for preparing a crystalline anhydrous salt of choline having a purity of at least 99% which comprises the steps of (1) reacting at least one mol of ethylene oxide with one mol of trimethylamine in an aqueous alcoholic solution containing one mol of water for each mol of said trimethylamine, the alcohol which is employed containing from 1 to 4 carbon atoms and being water-miscible, (2) admixing the resulting choline contained in the reaction mixture with at least one mol of an acid for each mol of said choline thereby forming a salt of said choline, (3) crystallizing out of said reaction mixture said choline salt, and (4) recovering said crystalline anhydrous choline salt.

2. The process of claim 1 in which said crystallization step is carried out between 0° and 5° C.

3. The process of claim 2 in which said period of time is at least about 6 hours.

4. The process of claim 1 in which the acid is dissolved in a water-miscible alcohol containing from one to four carbon atoms prior to admixing the acid with the choline-containing reaction mixture.

5. The process of claim 4 in which the temperature of said alcoholic solution of the acid is approximately the reflux temperature of said solution when it is admixed with the choline-containing reaction mixture.

6. The process of claim 5 wherein the acid is tartaric acid.

7. The process of claim 5 wherein the acid is citric acid.

8. A process for preparing crystalline anhydrous choline tartrate having a purity of at least 99% which comprises (1) reacting at least one mol of ethylene oxide with one mol of trimethylamine in an aqueous methanol solution containing one mol of water for each mol of said trimethylamine, (2) admixing the resulting reaction mixture with a refluxing methanol solution of tartaric acid, said solution containing at least one mol of tartaric acid for each mol of choline present in said reaction mixture thereby forming choline tartrate, (3) crystallizing out of said reaction mixture said choline tartrate, and (4) recovering said anhydrous choline tartrate.

9. A process for preparing crystalline anhydrous choline dihydrogen citrate having a purity of at least 99% which comprises (1) reacting at least one mol of ethylene oxide with one mol of trimethylamine in an aqueous methanol solution containing one mol of water for each mol of said trimethylamine, (2) admixing the reaction mixture with a refluxing isopropanol solution of citric acid containing at least one mol of citric acid for each mol of choline present in said reaction mixture thereby forming choline dihydrogen citrate, (3) crystallizing out of said reaction mixture said choline dihydrogen citrate, and (4) recovering said anhydrous choline dihydrogen citrate.

References Cited in the file of this patent

UNITED STATES PATENTS

| | | |
|---|---|---|
| 2,153,591 | Roeder | Apr. 11, 1939 |
| 2,589,707 | Korner | Mar. 18, 1952 |
| 2,623,901 | Klein et al. | Dec. 30, 1952 |

FOREIGN PATENTS

| | | |
|---|---|---|
| 8,031 | Great Britain | 1914 |

OTHER REFERENCES

Meyer et al.: Ber., 54, 2279 (1921).
Nakada: Chem. Abstracts, vol. 48, p. 12793 (1954).
Conant et al.: The Chemistry of Organic Compounds, p. 194 (1954).